Patented Apr. 26, 1949

2,468,522

UNITED STATES PATENT OFFICE 2,468,522

PRODUCTION OF NITRILES

John W. Teter, Chicago, Ill., assignor to Sinclair Refining Company, New York, N. Y., a corporation of Maine No Drawing. Application August 17, 1946, Serial No. 691,373

2 Claims. (Cl. 260—465.3)

This invention relates to improvements in the production of nitrogen-containing products, particularly nitriles, by the direct catalytic reaction of olefins with ammonia. It includes improvements in the process, and improved catalysts which are particularly effective in promoting the production of nitriles of low molecular weight, while repressing pyrolytic decomposition reactions of the hydrocarbon which result in the production of hydrocarbon polymer, tarry and carbonaceous material and the like.

The process for the production of nitrogen-containing products by the catalytic reaction of ammonia with olefins and catalysts useful for that purpose have been described in my applications Serial Nos. 464,636, 365,561, 365,562, 365,563, 444,094, issued as Patents Nos. 2,381,709, 2,381,470, 2,381,471, 2,392,107, 2,418,562, respectively, 444,095, now abandoned, 444,096 and 444,097, issued as Patents Nos 2,406,929 and 2,398,899, respectively. In general, the process is carried at elevated temperatures, from about 400° F. to about 725° F., with temperatures of about 640° F. to 650° F., particularly useful where the olefin is propylene, with somewhat higher temperatures representing the most effective range where the olefin is ethylene. The catalysts which have been described as useful in this procedure in general include reduced metal oxides, particularly cobalt oxide, deposited on an inert, porous carrier, such as diatomaceous earth, heat-treated magnesol, heat-treated bentonite, etc. In my application Serial No. 605,832, filed July 18, 1945, now abandoned, I have described catalysts consisting of reduced metal oxides, particularly cobalt oxide, with or without associated promoter or easily reducible metal oxide, deposited on a porous carrier, with the catalyst having a large surface area, and specified low contents of sodium, sulphate, and chloride, which is particularly effective in the process, giving large yield of the desired nitrogen-containing products with minimum hydrocarbon polymer or tarry.

The present invention provides improvements in the process which involves the use of a reduced metal catalyst, particularly cobalt, with or without associated promoter or other easily reducible metal oxide, deposited on titanium dioxide. The titanium dioxide, in contrast with the carriers specifically described in my earlier applications, is non-porous in character, and the catalysts of the invention, consisting of the catalytic metal or reduced metal oxide deposited on titanium dioxide, have relatively low surface areas, as determined for example by the nitrogen isotherm method or by the stearic acid absorption method. The surface areas of the improved catalysts of the invention may range around 40–50 square meters per gram, as determined by the nitrogen isotherm method with calculation by the Brunauer, Emmett and Teller method (J. A. C. S. vol. 60, p. 309, 1938).

It is important, in the new catalyst of the invention, that the sulfate and chloride content be low, not exceeding about 0.2%, and advantageously not exceeding about 0.1%. The alkali metal content, usually sodium, should also be low, not exceeding about 1%.

The new catalyst is advantageously prepared in the form of small agglomerates or pellets, as by pelleting or extrusion, after the deposition of the metal on a titanium dioxide carrier. The pelleted or agglomerated catalyst has good resistance to disintegration, and maintains its physical form for long periods of use. In addition, it combines high initial activity with long life in service, and is susceptible of reactivation by hydrogen and regeneration by oxidation followed by reduction without substantial loss in catalytic activity.

The catalyst which is most effective in causing the reaction between the olefin and ammonia to take place is reduced cobalt oxide. In general, the amount of the reduced cobalt oxide, which is largely present in the form of cobalt metal, as indicated by the fact that tests show the product to be ferromagnetic, although it is probable that some cobalt oxide, most probably cobaltous oxide, is present, will be equal to the amount of the carrier material, although the proportions of carrier and catalytic material may be varied. The catalytic material may consist of cobalt in admixture with other metals, such as zinc, manganese, magnesium, iron, nickel, and the like, particularly when such metals are included in proportions corresponding to those required to form spinels when in the form of their oxides with a cobalt oxide, that is, in stoichiometric proportions with the cobalt. Nickel has catalytic activity, and in view of its low cost as compared with cobalt, may in some cases be used instead of the cobalt as the catalytic metal.

The new catalysts of the invention are advantageously prepared by depositing cobalt or a mixture of cobalt or other metal, on the carrier, by reaction of a soluble cobalt or other metal salt with caustic soda or sodium carbonate in the presence of the slurried carrier, followed by washing, ignition, and reduction. Because of its cost, cobalt sulfate is advantageously used for the production of a cobalt catalyst. By precipitating by adding the solution of the cobalt salt to a slurry of the carrier in aqueous sodium carbonate or caustic soda, the washing of the resulting product to remove sulfate and to the lower levels required, is facilitated. I believe that this result is obtained by avoiding the presence of an excess of cobalt sulfate at any time, so that basic sulfates, which are removable by washing only with great difficulty, if at all, are not formed. In the washing operations, demineralized water having a very low content of sulfate and chloride ions is used. A typical production of a highly active catalyst, which has a long catalyst life, is illustrated by the following example:

*Example.*—To a solution containing 239.9 grams of anhydrous sodium carbonate per liter was added 143.2 grams of titanium oxide per liter while maintaining the temperature at 90° C. The mixture was thoroughly stirred, and then an equal volume of a solution of cobalt sulfate heptahydrate, containing 501.9 grams of the heptahydrate per liter, heated to a temperature of about 70° C., run in over a period of about ½ hour, while agitating the mixture vigorously. When the precipitation of the cobalt was complete, the mixture was allowed to stand for about one-half hour, and the solid material is removed by filtration and dried at 95–105° C. The dried product was broken up and washed with hot, demineralized water by reslurrying and filtering until the sulfate content was reduced to 0.011% and the sodium content 0.39%. The washed product was then ground to pass a 20-mesh screen and calcined for two hours at 350° C. The product was then pelleted, using 4% graphite as lubricant. The pelleted, calcined product was charged into a reactor and reduced, the reduction being carried out by passing hydrogen at atmospheric pressure at a space velocity (calculated at N. T. P.) of 50 cubic feet per hour per liter of catalyst while maintaining the temperature at 640° F. This reduction was followed by an ammonia purge involving the passage of ammonia at 1500 lbs. per square inch at a space velocity of 1.0 (liquid volume/volume of catalyst/hour) for six hours. The catalyst was then ready for use. Before reduction it had an apparent density of 1.39, contained 38.7% cobalt, 0.44% sodium, and 0.079% sulfate. The area of the catalyst as determined by the nitrogen absorption isotherm procedure was 47 square meters per gram and the stearic acid area was 43 square meters per gram. The product was pyrophoric and ferromagnetic.

After the reduction of the catalyst, a mixture of hydrocarbon, ammonia, and a small quantity of water was passed into the reaction vessel while maintaining the temperature at 640° F. and a pressure of 1500 pounds per square inch. The hydrocarbon feed contained 40.2% olefin, mainly propylene, with the balance alkanes, mainly propane. The molar ratio of ammonia to olefin was just under 10:1. The ammonia contained 0.2 wt. percent of water. The olefin space velocity (volume liquid olefin/volume of catalyst/hour) was 0.21, and the ammonia space velocity was 0.68. The reactor effluent was fractionated, the ammonia separated and recycled. The percentage of nitrogen-containing products, based on olefin charged and calculated as propionitrile, was 31%. The percentage of hydrocarbon polymer was 1.5%. The operation was carried out with alternate processing and reactivation of the catalyst, the processing being carried on for six hours and the catalyst being then reactivated. The temperature for reactivation was about 640° F. and the reactivation procedure consisted in passing hydrogen at 3,000 pounds through the catalyst bed at the rate of 2 cubic feet per hour per liter of catalyst followed by a purge with ammonia at 3,000 pounds pressure.

I claim:

1. In the production of nitriles from ammonia and olefin, the improvement which includes bringing a mixture containing ammonia and the olefin the ammonia being present in substantial excess into contact with a catalyst effective for the production of nitriles by the direct reaction of ammonia with olefins at a temperature within the range 400°–725° F. and pressure approximately 1500 pounds per square inch, said catalyst consisting essentially of a catalytically active reduced oxide of a metal selected from the group consisting of cobalt and nickel deposited on titanium dioxide as a carrier.

2. In the production of nitriles from ammonia and olefin, the improvement which includes bringing a mixture containing ammonia and the olefin the ammonia being present in substantial excess into contact with a catalyst effective for the production of nitriles by the direct reaction of ammonia with olefins at a temperature within the range 400°–725° F. and pressure approximately 1500 pounds per square inch, said catalyst consisting of a catalytically active reduced cobalt oxide deposited on titanium dioxide as a carrier.

JOHN W. TETER.

REFERENCES CITED

The following references are of record in the file of this patent:

UNITED STATES PATENTS

| Number | Name | Date |
|---|---|---|
| 1,920,795 | Jaeger | Aug. 1, 1933 |
| 2,137,101 | Spicer | Nov. 15, 1938 |
| 2,331,968 | Forney | Oct. 19, 1943 |
| 2,381,709 | Apgar et al. | Aug. 7, 1945 |
| 2,417,892 | Teter | Mar. 25, 1947 |
| 2,417,893 | Teter | Mar. 25, 1947 |
| 2,418,562 | Teter | Apr. 8, 1947 |

OTHER REFERENCES

Berkmann et al., "Catalysis" (Reinhold Pub. Co. 1940), pp. 903, 946.